United States Patent [19]

Yamauchi

[11] Patent Number: 5,348,114
[45] Date of Patent: Sep. 20, 1994

[54] FRONT CHASSIS FRAME FOR AUTOMOBILE

[75] Inventor: Makoto Yamauchi, Hiroshima, Japan

[73] Assignee: Mazda Motor Corporation, Hiroshima, Japan

[21] Appl. No.: 933,169

[22] Filed: Aug. 21, 1992

[30] Foreign Application Priority Data

Sep. 6, 1991 [JP] Japan .................. 3-78135[U]

[51] Int. Cl.$^5$ ............................................ B62D 25/08
[52] U.S. Cl. ................................. 180/291; 180/68.4;
296/194; 296/203
[58] Field of Search ................... 180/291, 292, 68.4,
180/68.6; 298/194, 203, 205, 189; 52/730.4,
731.2, 732.1

[56] References Cited

U.S. PATENT DOCUMENTS

| | | | |
|---|---|---|---|
| 4,141,426 | 2/1979 | Hamada et al. | 180/68.4 |
| 4,545,172 | 10/1985 | Wardill | 296/189 |
| 4,742,899 | 5/1988 | Thornton | 296/189 |
| 5,033,593 | 7/1991 | Kazuhito | 296/189 |
| 5,100,189 | 3/1992 | Fatamata et al. | 296/189 |
| 5,123,695 | 6/1992 | Kanemitsu et al. | 296/203 |

FOREIGN PATENT DOCUMENTS

| | | | |
|---|---|---|---|
| 250320 | 5/1963 | Australia | 180/68.4 |
| 0178266 | 4/1986 | European Pat. Off. | 180/68.4 |
| 60-286 | 6/1983 | Japan . | |

Primary Examiner—Richard M. Camby
Attorney, Agent, or Firm—Keck, Mahin & Cate

[57] ABSTRACT

A front chassis frame has a transversely extending front cross member at a front end of an automobile. The cross member has a closed cross section and a transversely extending corrugation formed on at least either an upper surface or a lower surface of the cross member.

10 Claims, 3 Drawing Sheets

FRONT CHASSIS FRAME FOR AUTOMOBILE

BACKGROUND OF THE INVENTION

The invention relates to a front chassis frame for an automobile.

RELATED ART STATEMENT

It is a known technique to provide a front cross member having a closed cross section with a chassis frame for an automobile at a front end thereof in order to obtain the rigidity required for a body of the automobile. For instance, Japanese Laid Open Application (Kokai) No. 60-286, which was filed on Jun. 17, 1983 and laid open to public on Jan. 5, 1985, discloses an automobile chassis frame including such a front cross member.

In these days, a front of an automobile body tends to be designed to have a slant nose shape or a short nose shape.

A front chassis frame needs to be constructed to be low in order to have a slant nose shape. However, it is difficult to construct a radiator elevationally to be low while it maintains its cooling characteristics. Therefore, a front cross member supporting a radiator thereon needs to be elevationally low in order to comply with the requirement for construction of a slant nose. On the other hand, if a front cross member is constructed to be low, its modulus of section decreases resulting in that the rigidity of an automobile body cannot be maintained at a desired level. Thus, an automobile needs to have a longitudinally long body or thicker frame in order to have desired modulus of section.

Furthermore, it is necessary to shorten a distance between a power plant such as an engine and a transmission and a front cross member in order to accomplish a short nose shape. Therefore, similarly to the aforementioned case, an automobile needs to have a long body or thicker frame to have necessary modulus of section of a front cross member. However, if a front cross member is constructed in such a way, the front cross member scarcely deforms by an impact force which comes from frontward of the automobile and acts on the front thereof. The impact force is not so much attenuated by the front cross member, it transmits to a power plant disposed behind the front cross member. Since a power plant generally has a high rigidity, the power plant is not deformed by the impact force and merely is moved backwards, resulting in undesired deformation in a cabin.

SUMMARY OF THE INVENTION

It is an object of the present invention to provide a front chassis frame for an automobile which can have a slant nose shape or a short nose shape and prevent the transmission of an impact force acting at a front of an automobile to a power plant by deforming to absorb an energy of the impact force.

The invention provides a front chassis frame having a transversely extending front cross member at a front end of an automobile. The cross member includes a closed cross section and also has a transversely extending corrugation formed on an upper surface and/or a lower surface of the cross member.

In a preferred embodiment, the corrugation is formed where a distance between the front cross member and a power plant disposed behind the front cross member is below a predetermined value. This is because, if the distance is long enough, the impact force does not transmit to the power plant unless the cross member deforms.

In another preferred embodiment, the corrugation is formed where the aforementioned distance is shortest.

The mode of operation of the aforementioned front chassis frame will be described hereinbelow.

The front cross member is constructed to have a closed panel structure in order to obtain a desired modulus of section for a front end of an automobile body. In addition, an upper surface and/or a lower surface of the front cross member is formed with at least one concave portion and/or convex portion which incorporate with each other to form a corrugation. The cross member is easily likely to deform longitudinally with respect to a body of an automobile without decreasing a modulus of section of the cross member. Therefore, when a front end of an automobile receives an impact force, the front cross member absorbs the impact force by compression deforming. Thus, the impact force to be transmitted to a power plant is attenuated and thereby does not affect a cabin disposed behind the power plant. In addition, to give an impact force absorbing capacity to a front cross member provides a broader range of design which allows a selection of a slant nose or a short nose.

The above and other objects and advantageous features of the present invention will be made apparent from the following description made with reference to the accompanying drawings.

DESCRIPTION OF THE PREFERRED EMBODIMENTS

Figure 1:
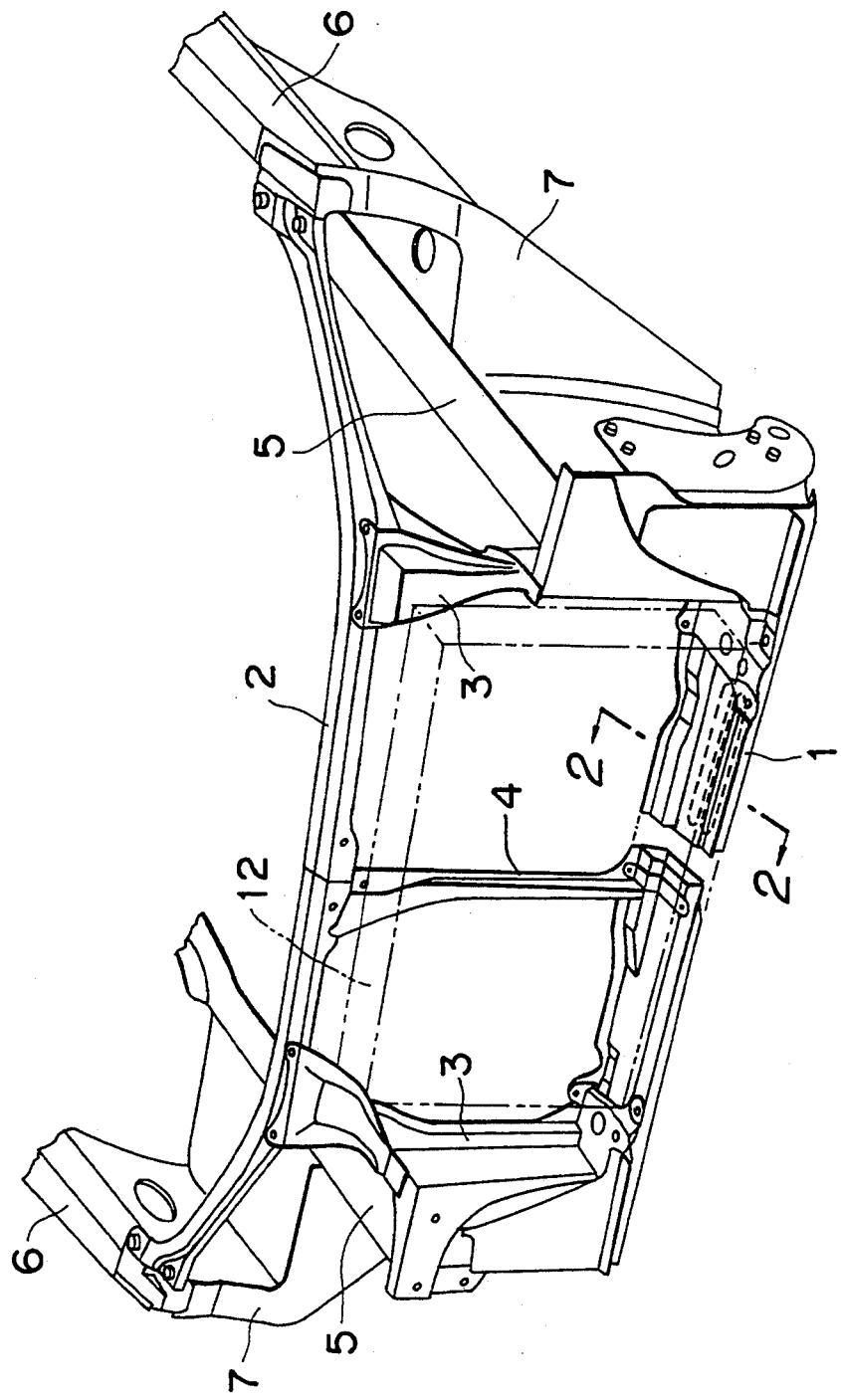
FIG. 1 is a perspective view illustrating a front chassis frame in accordance with the present invention.
Figure 2:
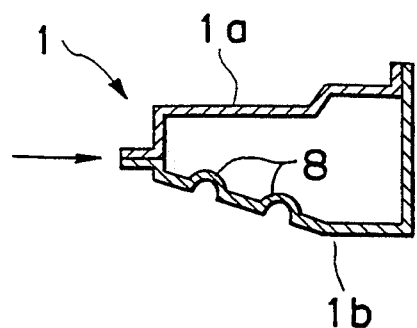
FIG. 2 is a cross sectional view taken along the line 2—2 in FIG. 1.

A preferred embodiment in accordance with the invention will be explained hereinbelow with reference to drawings. As shown in FIG. 1, a front chassis frame comprises a front cross member 1 transversely extending under a front end of an automobile, which cross member is generally called "No. 1 cross member" since it is disposed foremost of an automobile body, a shroud upper member 2 transversely extending at a front end of the automobile in parallel with the front cross member, a pair of shroud side stays 3 upwardly extending from opposite ends of the front cross member 1 for connecting the front cross member 1 to the shroud upper member 2, and a shroud center stay 4 upwardly extending from the center of the front cross member 1 for connecting the front cross member 1 to the shroud upper member 2. A pair of side frames 5 extending longitudinally are connected at their front ends to the shroud side stays 3. A pair of apron reinforcements 6 are connected at their front ends on their upper surfaces to opposite ends of the shroud upper member 2. The apron reinforcements 6 extend downwards and backwards from the connections to the shroud upper member 2 and are also connected to the side frames 5. At the front ends of the apron reinforcements 6 are provided shroud side panels 7 for forming front end walls of the apron reinforcements 6. As illustrated in FIG. 2, the front cross member 1 comprises a closed construction in cross section including an upper panel 1a and a lower panel 1b which are secured to each other at their front and rear ends. This geometric arrangement provides the front cross member 1 with a desired modulus of section for giving the rigidity to the front cross member 1 against a bending moment and/or a torsional moment. The closed construction of the front cross member 1 is longer longitudinally than vertically, and thus has a relatively low height. For this reason, this closed construction of the front cross member 1 is suitable for an automobile having a slant nose design. The lower panel 1b of the cross member 1 is formed with two convexes projecting into the inside of the closed construction of the front cross member 1 and extending transversely, in other words, in the same direction along which the front cross member 1 extends. These convexes form a corrugation 8 on the lower panel 1b, so that the longitudinal deformation of the front cross member 1 caused by an impact force received longitudinally is easily made.

Figure 3:
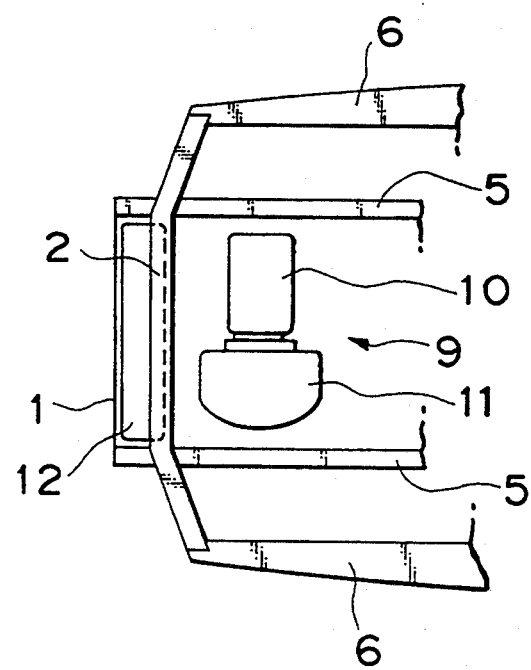
FIG. 3 is a top plan view illustrating a front chassis frame.

FIG. 3 is a top plan view of FIG. 1 and shows a positional relationship between the front cross member 1 and a power plant 9 including an engine 10 and a transmission 11. The engine 10 and the transmission are transversely disposed side by side and the front end of the transmission 11 is disposed more frontwards than the engine 10. In other words, the transmission 11 is nearer to the front cross member 1 than the engine 10 with respect to the longitudinal direction of the automobile. The corrugation 8 is formed on the lower panel 1b between the shroud center stay 4 and one of the shroud side stay 3 which is disposed nearer to the transmission 11 than the other.

The front cross member 1 has a portion projecting more frontwards than the shroud upper member 2, on which portion a radiator 12 is supported.

The mode of operation of the aforementioned embodiment is explained hereinbelow. When an automobile receives an impact force coming from the front of the automobile, the impact force first acts on the front cross member 1. As aforementioned, since the front cross member 1 is weakened in strength due to the corrugation 8 extending transversely of the automobile, the front cross member 8 is first collapsed longitudinally. Since the deformation of the front cross member 1 absorbs the energy of the impact force, the impact force is scarcely transmitted to the power plant 9, in particular, to the transmission 11.

In this specific embodiment, the engine 10 is disposed farther from the front cross member 1 than the front end of the transmission 11, so that the impact force is more difficult to transmit to the engine 10 than the transmission 11. For this reason, it is not necessary to form the corrugation 8 between the center stay 4 and one of the side stay 3 which is disposed nearer to the engine 10 than the other.

As explained with reference to the preferred embodiment, the corrugation 8 is preferably formed where a distance between the front cross member 1 and a power plant 9 disposed behind the front cross member 1 is shortest. This arrangement prevents the engine 10 and/or the transmission 11 from collapsing because the impact force received at the front end of the automobile is attenuated through the front cross member 1.

The corrugation 8 is preferably formed where the aforementioned distance between the front cross member 1 and the power plant 9 disposed behind the front cross member 1 is below a crush distance. The crush distance is defined as a distance by which the front cross member 1 moves to the power plant when the front cross member 1 receives an impact force, for instance, in an accident. The crush distance is in advance determined by a collision experiment, for instance. If the aforementioned distance is longer than the crush distance, it is unnecessary to form the corrugation 8. On the other hand, if the aforementioned distance is arranged to be shorter than the crush distance, it is necessary to form the corrugation 8 to prevent the front cross member 1 from colliding with the power plant 9 when the front member receives an impact force and deforms backwards.

Figure 4A:
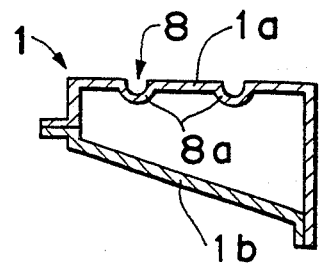
FIG. 4A illustrates a cross section showing concave corrugations in an upper panel of a front cross member.
Figure 4B:
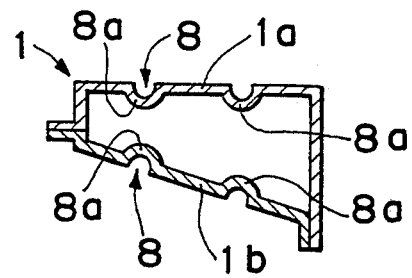
FIG. 4B illustrates a cross section showing concave corrugations in upper and lower panels of the front cross member.
Figure 4C:
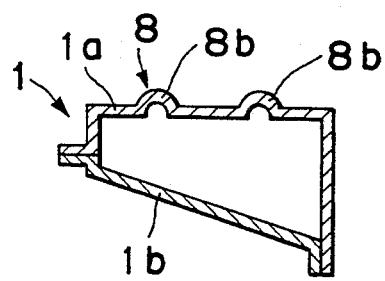
FIG. 4C illustrates a cross section showing convex corrugations in the upper panel of the front cross member.
Figure 4D:
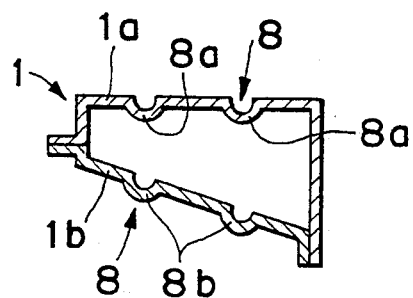
FIG. 4D illustrates a cross section showing concave corrugations in the upper panel and convex corrugations in the lower panel of the front cross member.

FIG. 4A to 4D illustrate various embodiments of the closed construction of the front cross member 1. FIG. 4A illustrates the corrugation 8 comprising concaves 8a formed on the upper panel 1a, FIG. 4B illustrates the corrugation 8 comprising concaves 8a formed both on the upper panel 1a and the lower panel 1b, FIG. 4C illustrates the corrugation 8 comprising convexes 8b formed on the upper panel 1a, and FIG. 4D illustrates the corrugation 8 comprising concaves 8a formed on the upper panel 1a and convexes 8b formed on the lower panel 1b. As shown in FIG. 4, the corrugation 8 can be formed of one or more convex(es) and/or concave(s).

As aforementioned with reference to the preferred embodiments, the present invention has many advantages. The front chassis frame in accordance with the invention is constructed so that the front cross member is deformed to absorb an impact force which an automobile receives at its front end. Thus, the impact force is never transmitted to a power plant and therefore the power plant does not move to a cabin of an automobile.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. In an automobile having a front chassis frame, including an elongated closed cross section front cross member disposed at a lower front end of an automobile and extending in a transverse direction of the automobile and in front of a power plant, and a side frame, extending in a longitudinal direction of the automobile, at each end of said front cross member and on opposite sides of said power plant, said front cross member having a leading edge, a trailing edge and upper and lower surfaces, the improvement comprising said cross member having a corrugation, extending in said transverse direction, formed on at least one of its upper surface and lower surface and in a location on said at least one of its upper surface and lower surface in front of said power plant, said corrugation weakening said cross member so that impact force acting in said longitudinal direction of said automobile deforms said cross member and is attenuated by deformation of said cross member.

2. In an automobile as defined in claim 1 the further improvement of the corrugation having at least one of a concave portion and convex portion.

3. In an automobile as defined in claim 1 the further improvement of the automobile having the power plant located behind the front cross member and at a distance from the cross member which is no longer than the distance through which the cross member is deformed when the cross member is subjected to said impact force acting in said longitudinal direction.

4. In an automobile as defined in claim 1 the further improvement of the closed cross section front cross member being trapezoidal in cross section with the larger base constituting the trailing edge.

5. In an automobile as defined in claim 4 the further improvement of the front cross member being comprised of one L-shaped part constituting the leading edge and one surface and another L-shaped part constituting the other surface and the trailing edge.

6. In an automobile as defined in claim 5 the further improvement of the two parts being joined by mutually engaging flange portions at the leading and trailing edges.

7. In an automobile as defined in claim 5 the further improvement of a plurality of corrugations being formed on the upper surface.

8. In an automobile as defined in claim 5 the further improvement of a plurality of corrugations being formed on the lower surface.

9. In an automobile as defined in claim 1 the further improvement of at least one corrugation being formed on each of the upper and lower surfaces.

10. In an automobile as defined in claim 1 the further improvement of a radiator supported by a frontward projection of said front cross member.

* * * * *